Patented Sept. 12, 1944

2,358,219

UNITED STATES PATENT OFFICE 2,358,219

PRODUCTION OF SOLUTIONS FOR THE MANUFACTURE OF ARTIFICIAL FIBERS

John Pringle Dickson, Saltcoats, and William Sever, Troon, Scotland, assignors to Imperial Chemical Industries Limited, a corporation of Great Britain No Drawing. Application November 13, 1940, Serial No. 365,554. In Great Britain January 2, 1940

10 Claims. (Cl. 18—54)

The present invention relates to the production of stable spinnable liquids or solutions suitable for the manufacture of artificial fibers, derived from the vegetable globulins separable from peanuts or ground nuts (Arachis hypogaea). There are now manufactured protein fibers by extrusion of casein solutions into coagulating baths, which, although they do not possess the organized structure of the hair of animals, are capable when suitably treated of being made into textiles and fabrics, either by themselves or in association with other textile fibers. By virtue of their chemical and physical properties they resemble the nitrogenous animal fibers more closely than fibers of a cellulosic nature. The fibers made under the present invention are of the same general character as those made from casein.

By treating with a considerable bulk of water comminuted peanuts or "ground nuts," from which at least a considerable proportion of the oil has been removed, referred to hereinafter as "ground nut meal," the globulins of the ground nuts can be extracted to a considerable extent; but higher yields are obtained when dilute aqueous saline or very dilute aqueous alkaline solutions are employed instead of water. The globulins, which have amphoteric properties, are recovered from the extract by admixture with sufficient acid to bring the pH to the isoelectric region of the globulins, advantageously about 4.4 to 5.5.

In the manufacture of artificial fibers for textile purposes from various materials by extruding a viscous solution as a thin jet into a setting bath, as in making rayon, an elaborate technique has been developed as the result of empirical experience. Any solution to be commercially spinnable; that is suitable for this purpose and making good fibers which can be made and handled in standard apparatus, must have a viscosity, stability and other physical properties of definite character. At the same time, to be commercial the solvents and other agents for accomplishing the result have to be cheap and used in as small amounts as possible. Other things being comparable the greater the concentration of film-forming material in solution, the better. An object achieved in the present invention is the production of a spinnable solution or liquid adapted for use in standard equipment; this liquid including peanut globulin and a small amount of caustic alkali. The desirable properties of the spinnable liquid are achieved by methodical manipulation, so to speak, rather than by use of unusual reagents or excessive amounts of reagents.

In manufacturing artificial fibers from proteins the general method consists in forming a solution of the protein in a suitable aqueous solvent and extending this through a spinneret into a suitable coagulating bath, the resulting fiber being subjected to a hardening treatment with formaldehyde or the like, and advantageously also with materials adapted further to increase its resistance to wet processing. It is, however, a matter of considerable difficulty to prepare solutions derived from ground nut globulins that will spin satisfactorily in the form of continuous fibers when extruded into a coagulating bath. In British Specification 467,704 there is described a method whereby filaments may be obtained from solutions made from ground nut protein and other vegetable globulins by dissolving them in an aqueous urea solution.

It is an object of the present invention to reduce the cost of the solution to be spun by the employment of a cheaper solvent, and another object to minimise wastage of coagulant. Further objects will appear hereinafter.

Notwithstanding the fact that ground nut globulins are very easily extracted from ground nut meal by means of aqueous inorganic alkaline solutions, it has hitherto been considered impossible to obtain solutions, capable of being spun into fibers of ground nut globulins in strong inorganic alkalis. The solutions hitherto obtained when even considerable concentrations of the protein have been dissolved in organic aqueous alkalis have usually been of negligible viscosity; and in other cases when viscous solutions are obtained those are liable either to become too rapidly fluid or also to set into the form of a jelly too quickly for any technical use to be made of them. We have found that the manner in which the globulins have been prepared from the ground nut meal may have a profound influence on the nature of the viscosity changes exhibited by solutions of the globulin mixture in aqueous strong inorganic alkalis.

We have found, however, that ground nut globulin may be rendered suitable for conversion into spun fibers of desirable properties if the ground nut globulin is maintained for a period of time in a solution of pH at least 12.5 when fresh, made up from the globulin at its isoelectric region, with an aqueous inorganic alkaline solution of sufficient alkali concentration to raise the pH value directly to that value as observed on testing the freshly made resulting solution. For this purpose there may conveniently be used a transparent foil of gelatinous colloidal material swellable in and permeable to water, such as regenerated cellulose impregnated or dyed with a pH indicator solution. Indicator foils of this kind are described in German Patent 405,091. Electrometric apparatus may also be used.

Globulins are very easily hydrolysed and destroyed by strong alkaline solutions with evolution of ammonia and in preparing them from the seed meal by an alkaline extraction process with alkali metal hydroxide solutions it is the custom to employ very dilute solutions of the alkali, and in practice the resulting extracts as ordinarily prepared show a pH below 12.5. Moreover in order to avoid an objectionable discolouration of peanut globulin by the colouring materials derived from the seed coat or residual portions thereof adhering to the nuts, it is advisable that the extraction of the protein with strongly alkaline substances should be so carried out that the pH of the extract does not exceed about 8.5. Naturally when only weakly alkaline materials are employed for the extraction, the pH of the extract remains correspondingly low and when water or neutral saline solutions are employed the extracts are slightly acidic.

While it is possible to maintain a globulin solution for a period of time at a pH above 12.5 by employing as the solvent for the extraction of peanut meal a dilute aqueous alkali metal hydroxide solution of an unusually high concentration, we prefer to effect the treatment with the alkaline solution of sufficient concentration to raise the pH value directly from the isoelectric region to at least 12.5 in the course of preparing the caustic alkaline solution that is to be extruded through the spinneret.

The concentration of ground nut globulin required in a solution to be made into filaments is very much greater than that ordinarily present in extracts made from ground nut meal for the purpose of isolating the globulin, and we have found that the concentration of caustic alkali required to produce a suitable solution for spinning is considerably higher than those ordinarily employed for such extractions. The concentration of the caustic alkali solution used as solvent must also be chosen on a sliding scale in relation to the concentration of the globulins in the solution. Samples of ground nut globulin may have varying initial viscosity characteristics, and it may therefore be necessary to make up solutions of differing globulin content in order to achieve spinnable viscosities, for instance from about 15 to about 35 parts globulin per 100 parts water reckoned as globulin dried to constant weight in air at 100° C., for which the amount of sodium hydroxide required may range from about .7 to about 1.5 parts.

Apart from the necessity of ensuring that the pH of freshly made solution shall be at least 12.5 there is for each sample of globulin an optimal protein concentration and an optimal sodium hydroxide concentration dependent on the latter, from which no wide departure can be made if reasonable stability of spinning viscosity is to be expected, and it is desirable to determine this by a method of successive approximations with test portions of the globulin, using the undernoted mathematical rule expressing the relationship between the amounts of sodium hydroxide and ground nut globulin required for each 100 parts water as a guide. The rule used is that the amount of sodium hydroxide required per 100 parts water may be taken as 0.16 part plus 0.036 part per part globulin employed, reckoned as globulin dried to constant weight in air at 100° C. Should another alkali metal hydroxide such as potassium hydroxide be employed, the molecularly equivalent quantities are to be substituted for the figures calculated above for sodium hydroxide.

The reason why the rule cannot be used in all cases directly as a complete indication of the required concentrations is two-fold. Firstly the intrinsic viscosity characteristics of different samples of globulin may vary very widely so that to attain reasonable viscosities widely varying globulin concentrations may be required. Secondly in the case of samples of ground nut globulins obtained by certain methods of preparation the loss or gain in viscosity on storage of solutions made up with caustic alkali concentrations slightly below a critical region, and the loss of viscosity on storage of solutions made up with caustic alkali concentrations above the critical region, are extremely pronounced.

In determining the optimal amounts there is first found the precise critical concentration of alkali at which the viscosities remain most stable for some arbitrary globulin concentration. This critical amount of alkali may be found by direct observation of the viscosities of a small series of solutions of the chosen globulin content, which is advantageously between 15 and 35 parts reckoned as material dried to constant weight in air at 100° C. per 100 parts water made up with slightly differing amounts of alkali ranging on both sides of that calculated according to the rule. The concentrations of the caustic alkali solutions employed for this purpose may conveniently differ by increments of about 1/100 normal, and the measurements are made over a sufficient period of time to show how far the solutions are maintaining their character as viscous liquids. A series of solutions may next be made up with differing amounts of globulin per 100 parts water, the appropriate amount of caustic alkali required for making up each solution being calculated from the critical alkali concentration already determined for one globulin concentration, in accordance with the rule that an increment or decrement of one part protein per 100 parts water requires a corresponding increment or decrement of 0.036 part sodium hydroxide, or the molecular equivalent of other caustic alkali used. The solutions so made up will be found to be of a reasonable constancy in viscosity and that having the most suitable viscosity for spinning purposes may be chosen, or there may be further observed the effect of minute variations in the caustic alkali concentrations from that forecasted as described hereinbefore, on the viscosity properties at one or more of such globulin concentrations.

The effect of varying the process for the extraction of the globulin from a batch of ground nut meal is mainly to alter the concentration of protein required to yield a solution of suitable viscosity for spinning, and it is usually unnecessary to start the whole process of determination of the optimum values afresh for each preparation of ground nut globulin from the meal.

Thus, once it has been determined at about what concentration it is desirable to employ the particular sample of globulin it is often quite satisfactory simply to make up a solution in accordance with the aforementioned arithmetical rule. Solutions made up according to this rule or according to the more refined procedure already referred to will in fact have a pH not less than 12.5, and, depending on the method by which the protein has been made this figure may drop over a variable period of time to a value in the region of 11, but the solution will not necessarily thereby be rendered unsuitable for spinning.

In making up the solutions to be tested and the solutions to be spun into filaments from the protein isolated from the ground nut meal it is necessary to ensure that the protein does not remain in contact for any substantial period of time with an amount of alkali less than the full amount required such that the freshly made mixture or solution has a pH substantially below 12.5 for a subsequent addition of the remainder of the alkali required to bring the solution to a pH of 12.5 will not yield a solution maintaining a spinnable viscosity. It is therefore preferred that each solution for test or for spinning should be made up with the full calculated amount of alkali corresponding to the weight of protein employed. In view of this remarkable difference between the results obtained when the whole of the required alkali is introduced at one time and when it is introduced step-wise over a period of time, the truly surprising nature of our invention may be appreciated, for by means of our invention it is possible successfully to prepare solutions maintaining a spinnable viscosity from peanut globulin whether the globulin has been extracted from the peanut meal by an alkali extraction process at a pH above 12.5 or below 12.5, or by a natural saline process or even by water, provided that the globulin extract has been acidified to the isoelectric region.

In making up the solutions for examination of viscosity and for extrusion we prefer to mix the globulin with the greater part of the water and to add the required alkali as a stronger solution, for instance of 4 to 10 per cent. concentration with agitation. Homogenisers or the like may be employed to assist the dispersion of the globulins in the caustic alkali solutions. The globulin dissolves almost immediately to form a clear and apparently uniform solution of which the pH may be tested, but it may be some time before the solution has acquired sufficient homogeneity of structure to render it suitable for spinning. The solutions obtained according to our invention remain suitable for extrusion for many hours and may even remain in good condition for some days. They should be deaerated and filtered before they are extruded.

If desired deaeration may be facilitated by warming the solution, whereby its viscosity may temporarily be reduced.

In preparing the filaments it is desirable to stretch while coagulating the solution, and the material may advantageously be removed from the coagulating bath at a linear speed from 4 to 7 times the linear speed of extrusion calculated from the size of each extrusion orifice and the rate of supply of the globulin solution.

The spinning bath may advantageously consist of a strong saline solution containing a small amount of free mineral acid.

It is desirable that the salt generated by the reaction between the acid in the coagulating bath and the alkali in the globulin solution should be the same as that employed in the coagulating bath. The bath may then be fortified continuously or at intervals by addition or further quantities of the salt and the acid.

The invention is further illustrated by the following examples in which the parts are parts by weight.

*Example 1*

A ground nut globulin mixture used is prepared from ground nut meal, already extracted with an organic solvent in the cold to remove the oil, by extraction with about 20 times its weight of 0.15 per cent. sodium hydroxide, and precipitation from the filtered extract with sulphur dioxide at pH 4.5 to 5, washing and drying to 9 per cent. moisture content. 2.5 kg. of the globulin mixture so prepared are made into a cream with 7.323 kg. water and 2.55 kg. normal sodium hydroxide solution are stirred in rapidly. The mixture is run through a homogeniser and is kept at a temperature of 35° for half an hour under a vacuum to remove air bubbles. It is then allowed to cool to 20° C. The viscosity remains within a spinnable range for several days at this temperature. The solution is extruded through a spinneret into a spinning bath containing 15 parts anhydrous sodium sulphate, 84½ parts water and ½ part 98 per cent. sulphuric acid kept at 40° C. and the filament wound up at five times the linear speed of extrusion is then soaked in sodium chloride while extended and subjected for 24 hours at 35° C. with 15 times its weight of a solution containing 12 parts 40% formaldehyde, 4 parts saturated hydrochloric acid, 36 parts sodium chloride and 87½ parts water per 100 parts solution.

*Example 2*

The ground nut meal is the same as that used in Example 1. The globulins are extracted from it with 20 times its weight of 0.05 per cent. sodium hydroxide, and are precipitated from the filtered extract with sulphur dioxide pH 4.5 to 5. The globulin mixture is washed with water and dried to 9 per cent. moisture content. 30 parts of the globulin mixture so obtained are made up into solution with 74.4 parts of water and 24 parts 5 per cent. sodium hydroxide. The solution so obtained maintains a spinnable viscosity for several days, and filaments are prepared from it as described in Example 1.

The solutions of the globulins made up for spinning according to the above examples show when freshly made up a pH not less than 12.5, as indicated by the colour developed on a regenerated cellulose strip impregnated with a mixed indicator, the colour on the portion of the strip in contact with the viscous alkaline solution being compared with a range of standard tinted strips after 60 seconds contact with the solution. The amounts of sodium hydroxide used according to the examples are in each case those found by the method referred to hereinbefore; wherein the precise alkali concentration corresponding to an arbitrary globulin concentration is first determined, and a fresh series of solutions is made up of varying globulin concentrations with sodium hydroxide concentrations varying from the said precisely determined alkali concentration by an increment or decrement of 0.036 part per unit increment or decrement of protein. The amounts of sodium hydroxide present per 100 parts water are respectively 0.98 and 1.20 whereas the amounts calculated by a simple direct application of the sliding scale rule would have been 0.99 and 1.14 respectively.

The period of time for which it is necessary to mature the alkaline solution, having when fresh a pH of at least 12.5, before it can be spun, may vary according to the history of the protein and other factors, and in practice at room temperature a few hours maturing may be required. De-aeration may be carried out during maturing. In many cases the viscosity tends to rise during this period. It is convenient in testing solutions for magnitude and constancy of viscosity to consider in particular their behaviour during a period that would correspond in practice with the period during which it would be spun, which might in practice commence for instance anything from six hours to a day after making up the solution. It is usually convenient to have when spinning commences a viscosity between 25 and 250 poises that should not more than double or halve itself during a working day thereafter.

As many apparently widely different embodiments of the invention can be made without departing from the spirit and scope thereof, it must be understood that the invention is not limited to any specific embodiment except as defined in the appended claims.

We claim:

1. A method of preparing a solution from which fibers can be spun by extrusion which comprises forming directly from ground nut globulin at its isoelectric region, a viscous solution having a pH, when fresh, within the range of at least 12.5 and lower than that pH value which would cause substantial hydrolysis or destruction of the protein, containing from about 15 to 35 parts of the globulin reckoned on globulin dried to constant weight at 100° C. and an amount of caustic alkali stoichiometrically equivalent to about 0.7 to 1.5 parts sodium hydroxide, per 100 parts water.

2. A method of preparing a solution from which fibers can be spun by extrusion which comprises making up directly from ground nut globulin at its isoelectric region, a caustic alkaline solution thereof, having a pH, when fresh, within the range of at least 12.5 and lower than that pH value which would cause substantial hydrolysis or destruction of the protein, containing for every 100 parts water, an amount of caustic alkali stoichiometrically equivalent to 0.16 part sodium hydroxide, approximately, plus an amount of caustic alkali stoichiometrically equivalent to 0.036 part sodium hydroxide approximately per part of globulin reckoned as globulin dried to constant weight at 100° C.

3. A method of preparing a solution from which fibers can be spun by extrusion which comprises (1) making up directly from ground nut globulin at its isoelectric region a series of globulin solutions in caustic inorganic alkali which solutions have a pH, when fresh, within the range of at least 12.5 and lower than that pH value which would cause substantial hydrolysis of the protein, all solutions having the same globulin content lying within the approximate range 15 to 35 parts globulin (dried to constant weight at 100° C. basis) per 100 parts water, and containing different amounts of said alkali differing to varying degrees from an amount of said alkali per 100 parts water stoichiometrically equivalent to 0.16 part sodium hydroxide plus 0.036 part sodium hydroxide per part of globulin reckoned as globulin dried to constant weight at 100° C., (2) forming a further series of test solutions of varying globulin content similarly made up using an alkali content diverging from that which yielded the most stable viscosity in the first series of tests by an increment or decrement equivalent to 0.036 unit sodium hydroxide per unit increment or decrement of globulin, reckoned as dried at 100° C., and finally (3) similarly making up a spinning solution having globulin and alkali concentrations the same as those of a test solution giving a desirable spinning viscosity in the second series of tests.

4. A method of preparing a peanut globulin solution capable of being spun into fibers which comprises forming a solution of a peanut globulin at its isoelectric region with an aqueous inorganic caustic alkali solution containing caustic alkali in amount stoichiometrically equivalent to approximately 0.7 to 1.5 parts sodium hydroxide for 100 parts water, the solution being of sufficient concentration to raise the pH of the globulin solution, as freshly prepared, directly to at least 12.5, and lower than a pH value such as to cause substantial hydrolysis or destruction of the protein and insufficient to cause the resulting solution to undergo a substantial change in viscosity; and maturing the solution to enable it to be spun into fiber.

5. The method of claim 4 with the additional step of deaerating the globulin solution.

6. A method of preparing coagulated peanut globulin fibers which comprises forming a solution of a peanut globulin at its isoelectric region with an aqueous inorganic caustic alkali solution containing caustic alkali in amount stoichiometrically equivalent to approximately 0.7 to 1.5 parts sodium hydroxide for 100 parts water, the solution being of sufficient concentration to raise the pH of the solution as freshly prepared directly to at least 12.5 and lower than a pH value such as to cause substantial hydrolysis or destruction of the protein and insufficient to cause the resulting solution to undergo a substantial change in viscosity; maturing the solution to enable it to be spun into fiber, extruding the matured solution into an aqueous coagulating bath maintained at about 40° C. and containing not less than 10 per cent sodium sulfate and between 0.25 and 2.5 per cent sulfuric acid and removing the coagulated filament from the bath.

7. A method as defined in claim 6 wherein the filament is removed from the bath more rapidly than its rated extrusion whereby stretching occurs.

8. A matured aqueous alkaline peanut globulin solution capable of being spun through spinnerets into a coagulating batt to form fibers, comprising peanut globulin in proportion approximately 15 to 35 parts (reckoned as globulin dried to constant weight at 100° C.) per 100 parts water and caustic alkali in amount of stoichiometrically equivalent to approximately 0.7 to 1.5 parts sodium hydroxide per 100 parts water, said solution as freshly prepared, having a pH at least 12.5 but lower than values at which any substantial hydrolysis or destruction of the globulin occurs, and in its matured state having a viscosity within the approximate range 25 to 250 poises.

9. A method of preparing a solution from which fibers can be spun by extrusion which comprises making up directly from ground nut globulin at its isoelectric region, a caustic alkaline solution thereof, having a pH, when fresh, within the range of at least 12.5 and lower than that pH value which would cause substantial hydrolysis or destruction of the protein, containing for every 100 parts water, an amount of caustic alkali stoichiometrically equivalent to 0.16 part sodium hydroxide, approximately, plus an amount of caustic alkali stoichiometrically equivalent to 0.036 part sodium hydroxide approximately per part of globulin reckoned as globulin dried to constant weight at 100° C., said solution containing sufficient ground nut globulin for forming a viscous solution capable of being spun by extrusion in fibers.

10. A method of preparing a solution from which fibers can be spun by extrusion which comprises making up directly from ground nut globulin at its isoelectric region, a caustic alkaline solution thereof, having a pH, when fresh, within the range of at least 12.5 and lower than that pH value which would cause substantial hydrolysis or destruction of the protein, containing for every 100 parts water, an amount of caustic alkali stoichiometrically equivalent to 0.16 part sodium hydroxide, approximately, plus an amount of caustic alkali stoichiometrically equivalent to 0.036 part sodium hydroxide approximately per part of globulin reckoned as globulin dried to constant weight at 100° C., said solution containing from about 15 to 35 parts of globulin reckoned on globulin dried at constant weight at 100° C. per 100 parts water.

JOHN P. DICKSON.
WILLIAM SEVER.